(No Model.)
L. E. MELLEN.
PLIERS.
No. 499,638. Patented June 13, 1893.
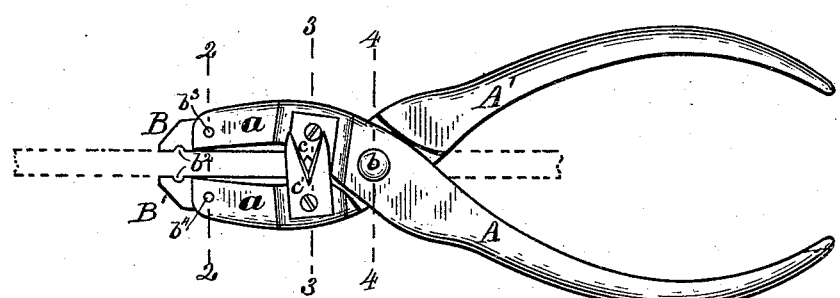
Fig. 1.
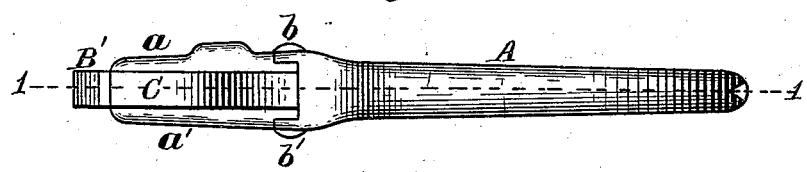
Fig. 2.
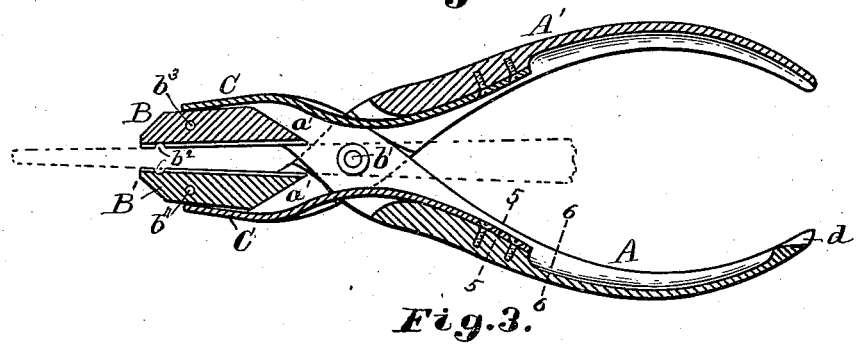
Fig. 3.
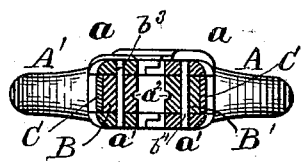 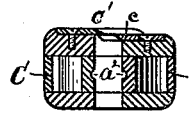 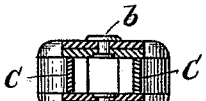
Fig. 4. Fig. 5. Fig. 6.
 
Fig. 7. Fig. 8.
Fig. 9.
Witnesses
Geo. A. Sewall
John Burke
Inventor.
Luther E. Mellen
by N. C. Lombard
Attorney

UNITED STATES PATENT OFFICE.

LUTHER E. MELLEN, OF MIDDLEBURY, VERMONT.

PLIERS.

SPECIFICATION forming part of Letters Patent No. 499,638, dated June 13, 1893.

Application filed November 19, 1892. Serial No. 452,477. (No model.)

*To all whom it may concern:*

Be it known that I, LUTHER E. MELLEN, of Middlebury, in the county of Addison and State of Vermont, have invented certain new and useful Improvements in Pliers, of which the following, taken in connection with the accompanying drawings, is a specification.

My invention relates to pliers and it consists in certain novel features of construction, arrangement and combination of parts which will be readily understood by reference to the description of the drawings and to the claims hereinafter contained and in which my invention is clearly pointed out.

Figure 1 of the drawings is a side view of a pair of pliers embodying my invention. Fig. 2 is an edge view of the same. Fig. 3 is a longitudinal section on line 1 1 on Fig. 2. Fig. 4 is a transverse section on line 2, 2, on Fig. 1, looking toward the right. Fig. 5 is a transverse section on line 3, 3, on Fig. 1 looking toward the left. Fig. 6 is a transverse section on line 4, 4, on Fig 1. Fig. 7 is a transverse section of one of the handles on line 5, 5, on Figs. 3, and 9. Fig. 8 is a similar section on line 6, 6, on Figs. 3 and 9, and Fig. 9 is an inside elevation of a portion of one of the handles.

In the drawings A and A' are the operating levers, the forward or short arms of which are bifurcated, and each arm $a$ and $a'$ of the fork is halved, or reduced in thickness, where said arms cross each other, the two arms on each side of the gripping jaws being pivoted together by independent pivot-pins, $b$ and $b'$ in axial line with each other, so as to leave an unobstructed opening through the center of the tool from the gripping jaws to the extremity of the handles so that a long rod or tool may be passed between the jaws and extend toward the long arms of said handles beyond their pivotal connections.

B and B' are two jaws pivoted by pins $b^3$, $b^4$, to the forked arms of the levers A and A' respectively, near their ends, and each provided with a longitudinal groove $a^2$, and a transverse groove $b^2$, in its inner face to facilitate a firm and rigid hold upon a wire or small round tool. Each of the levers A and A' has secured thereto, by one end, a spring C, the opposite end of which bears with considerable tension upon the outside of the gripping jaw which is pivoted to the short arm of the other lever as shown in Fig. 3, the tension of which springs tends to force said jaws toward each other and cause them to grip a tool or article placed between them with sufficient force to hold the same in position ready for use, if for any reason the pliers are laid down before completing the operation in hand. This construction of operating levers, jaws and springs renders the instrument adapted to grip and hold an object having parallel sides as shown in Fig. 1 or divergent sides as shown in Fig. 3.

The levers A and A' may be steel castings or drop forgings, as may be preferred.

Two steel cutters $c$ and $c'$ having V shaped notches in their operating ends are secured to the outer faces of the two arms $a$, $a'$, of the forked ends of the levers A and A' in such a manner as to overlap each other as shown in Figs. 1 and 5, and by means of which wire or other small metal articles may be cut off. One of the levers, as A, has formed in its end a V shaped notch $d$ to be used in drawing tacks or for any similar purpose. It will be seen that the jaws B and B', by virtue of their being connected to the operating levers A and A' respectively by a single pivot each, will, when brought to bear upon any object placed between them, accommodate themselves to the longitudinal shape of said object whether its sides are parallel or tapered in either direction and grip said object with a force equal to the tension of the springs C.

In operating my improved pliers in order to open the jaws to seize an article it is necessary to move the handle ends of the levers A and A' farther apart, as is the case with all pinchers or pliers with which I am familiar, but when the pressure, which opens said handles, is removed the tension of the springs causes the jaws to close upon the object placed between them and grip it as described above, and the grip is increased to the desired degree by the hand of the operator pressing the handle ends of the levers A and A' toward each other in a well known manner. The cutters $c$ and $c'$ carried by the short arms of the levers A and A' and the notch $d$ in the end of one of said levers enable the operator to perform several operations without the trouble of looking up several separate tools.

What I claim as new, and desire to secure by Letters Patent of the United States, is—

1. The combination of a pair of bifurcated operating levers the forked ends of which cross each other and are connected together by two independent pivots in axial line with each other; a pair of gripping jaws connected one to the forked end of each of said operating levers by a single pivot pin; and a pair of springs each secured by one end to one of said operating levers and bearing at its other end upon the outer surface of the jaws pivoted to the other operating lever.

2. The combination of a pair of bifurcated operating levers the forked ends of which cross each other and are connected together by two independent pivots in axial line with each other; a pair of gripping jaws connected one to the forked end of each of said operating levers by a single pivot-pin and each having formed in its inner face a groove to receive the article to be gripped; and a pair of springs each secured by one end to one of said operating levers and bearing at its other end upon the outer surface of the jaw pivoted to the other operating lever.

3. The combination with a pair of gripping jaws, and a pair of operating levers constituting a pair of pliers, of a pair of detachable cutting blades having V-shaped notches in their operating ends secured one to each of the operating levers and overlapping and co-operating with each other substantially as and for the purposes described.

In testimony whereof I have signed my name to this specification, in the presence of two subscribing witnesses, on this 15th day of November, A. D. 1892.

LUTHER E. MELLEN.

Witnesses:
MILTON A. BROOKS,
LIZZIE M. BROOKS.